Feb. 27, 1973  TAKASHI KATSUTA ET AL  3,718,752
COLOR TELEVISION CAMERA
Filed Dec. 28, 1970

INVENTORS
TAKASHI KATSUTA
KENICHI KANO
BY MITSURU KAWASAKI
YASUICHI USHIYAMA
Sandoe, Hopgood & Calimafde
ATTORNEYS 3,718,752

COLOR TELEVISION CAMERA

Takashi Katsuta, Kenichi Kano, Mitsuru Kawasaki, and Yasuichi Ushiyama, all % Nippon Electric Company, Limited, 7-15 Shiba Gochome, Minato-ku, Tokyo, Japan Claims priority, application Japan, Dec. 27, 1970, 46/938
Int. Cl. H04n *9/08;* G02b *27/14*
U.S. Cl. 178—5.4 TC 2 Claims

ABSTRACT OF THE DISCLOSURE

A color television camera employs a receiving lens system for directing light corresponding to a viewed subject along a first axis of a compound color separation prism. Also, auxiliary light from a source thereof, as for bias light purposes, is directed to the prism along an axis distinct from the first axis.

The properties and internal construction of the color separation prism are such that light from both the viewed subject, and that from the auxiliary light source, are divided into three primary color components thereof which are emitted through differing exit port faces of the prism.

The present invention relates to color television cameras and, more particularly, to a color separation prism used for color television cameras.

As is well-known in the prior art, a color television camera has a receiving lens system, a color separation optical system and pick-up tubes. Light from a viewed scene or objects passes through the input receiving lens system and color separation optical system. The image is then formed on the screen of pick-up tubes corresponding to a R (red) channel, a G (green) channel, and a B (blue) channel, respectively, to be converted into electrical signals thereat.

The color television camera in which a plumbicon tube is used for a pick-up tube is in common use. This type of color television camera has several advantages such as high signal-to-noise ratio, low shading, and the like. On the other hand, however, residual image becomes conspicuous when shooting a dark scene, resulting in an unpleasant picture on the screen. This means that the effective sensitivity of the camera is determined by the residual image characteristic rather than the signal-to-noise ratio of the preamplifier.

Residual images in the plumbicon tube are of the following two kinds: one is the photo-conductive residual image due to the fact that the conduction of the charge excited in the 1-layer of the PbO film used for the photoconductive film of the plumbicon tube by the incidence of light thereto is interfered with by the trap present therein. The other, capacitive residual image is due to the landing of the scanning beam used in the low speed scanning method. It is known that such a residual image is reduced by bias illumination effected by applying uniform light to the target surface of the pick-up tube.

Referring to the color separation optical system of a color television camera, there has been used a color separation prism as shown in FIG. 1 In this conventional color separation prism, the color separation plane *z–z'*, which is the blue separation plane in FIG. 1, is coincident with the total reflection plane, so that entrance of light into the prism is limited to the direction of the main axis *x–x'* for allowing distribution of the light into red, blue and green channels. It has therefore been difficult to apply the above described method for reducing a residual image for a prior art color television camera having a prism system comprising a color separation prism such as shown in FIG. 1, wherein the color separation plane is coincident with the total reflection plane. Even if this method could be applied, excellent properties have not been obtained.

It is therefore an object of the present invention to provide an improved color separation prism for a color television camera which obviates the above difficulties.

Another object of the present invention is to provide an improved color television camera in which auxiliary light, such as bias light, a light comprising a test chart or the like, can be applied without any harmful effect to light from viewed objects.

According to the present invention, a color television camera can be obtained in which a prism, having a color separation plane not coincident with the total reflection plane, is used for the color separation optical system, and bias light is directed toward the total reflection plane.

The invention will be better understood from the following description of an illustrative embodiment thereof, discussed in detail hereinbelow, in connection with the accompanying drawings, in which.

Figure 1:
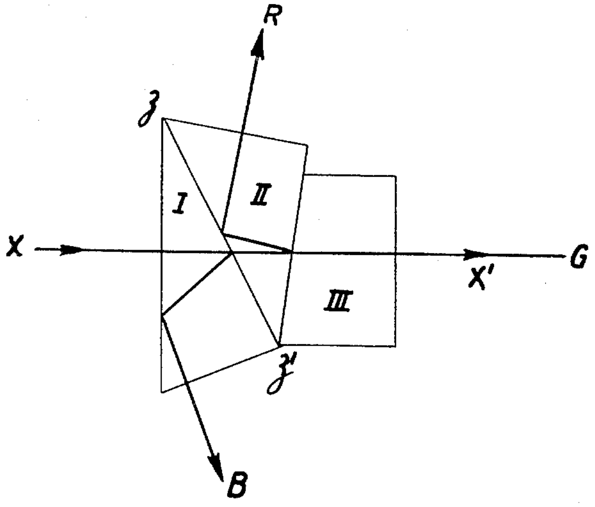
FIG. 1 is a diagram showing a conventional color separation prism.
Figure 2:
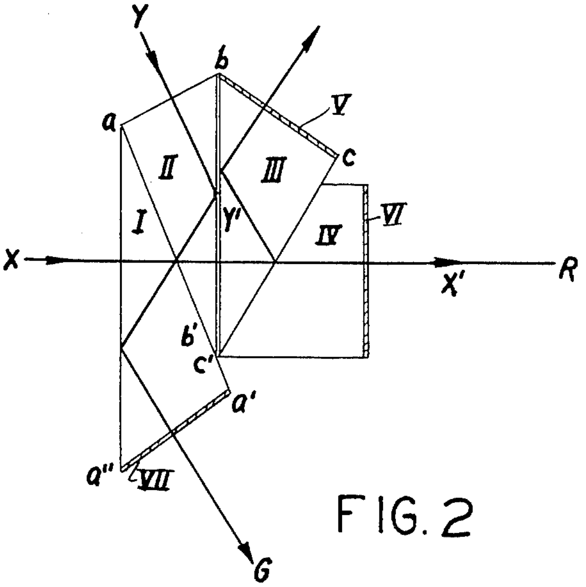
FIG. 2 depicts a color separation prism used for the purposes of the present invention.

Referring to FIG. 2, there is shown a color separation prism of an embodiment of this invention. The color separation prism comprises four prism blocks I, II, III and IV. At the junction *a–a'* between prism blocks I and II, there is formed a first color separation plane such as a dichroic plane which separately reflects, for example, the green wavelength component. Similarly, at the junction *c–c'* between prism blocks III and IV, there is formed a dichloric plane which separately reflects the blue wavelength component. There is an air gap (for example, 0.1 mm. wide) at the junction portion *b–b'* between prism blocks II and III. The junction portion *b–b'* is a total reflection plate which is disposed after the first dichroic plate and independently therefrom. In particular, the first color separation plane and the following total reflection plane are not coincident with one another. Hence, the color separation prism shown in FIG. 2 has not only a main axis *x–x'*, but also a second light input axis Y–Y'.

The light from the viewed objects is admitted into the prism block I through the entrance plate *a–a''* along the main axis *x–x'*, and the green component of the light is reflected at the dichroic plane *a–a'*. The remainder of the incident light penetrates the dichroic plane *a–a'* and, thereafter, the blue component is reflected at the dichroic plane *c–c'*. The remainder penetrates the dichroic plane *c–c'*.

The green component, which has been reflected at the dichroic plane *a–a'*, is totally reflected at the plane *a–a''* and emitted through a green trimming filter VII. The blue component, which has been reflected at the dichroic plane *c–c'*, is totally reflected at the total reflection plane *b–b'* and emitted through a blue trimming filter V. The rest of the light, which has penetrated the dichroic plane *c–c'*, is emitted as red component through a red trimming filter VI.

It will be appreciated from about descriptions that light from objects is thus separated into three primary color components (green, blue and red) in the prism shown in FIG. 2.

Light which is admitted into the prism block II through the entrance plane *a–b* along the auxiliary axis Y–Y′ is totally reflected at the reflection plane *b–b′* and, thereafter, is divided at the plane *a–a′* in two. One part of this incoming light advances through the prism block I is totally reflected at the reflection plane *a–a″* and, thereafter, is emitted as a green component through the green trimming filter VII. The other light portion is reflected at the plane *a–a′*, and thereafter advances along the main axis *x–x′*.

Figure 3:
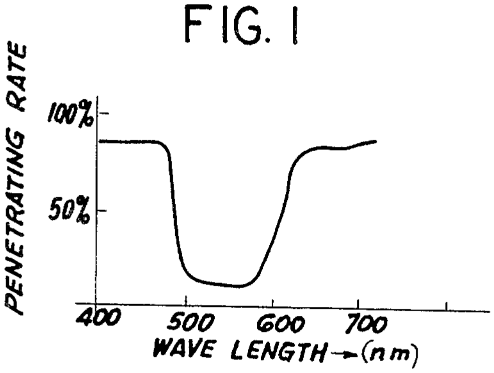
FIG. 3 is a diagram showing an example of the transmission characteristic of a green separation dichroic plane.
Figure 4:
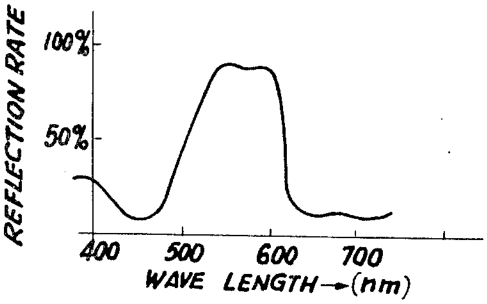
FIG. 4 is a diagram showing an example of the reflection characteristic of the green separation dichroic plane.
Figure 5:
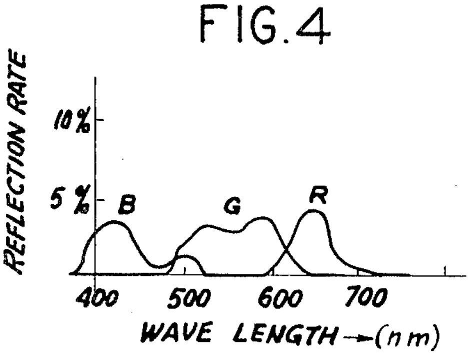
FIG. 5 is a diagram showing an example of the output wavelength composition of each channel of a color television camera according to this invention.

The light which has been reflected at the plane *a–a′* advances through prism blocks II and III along the main axis *x–x′*, and is divided at the blue dichroic plane *c–c′* into a blue component, and into a remainder part. The blue component is reflected at the blue dichroic plane *c–c′* and, thereafter, is emitted through the blue trimming filter V after a total reflection at the reflection plane *b–b′*. The remainder penetrates the blue dichroic plane *c–c′*, and is emitted as a red component through the red trimming filter VI. The wavelength composition of the penetrating component, and that of the reflected component, are illustrated in FIG. 3 and FIG. 4, respectively. FIG. 5 depicts the combined characteristics of the separated light outputs R, G and B versus the light input from the direction of axis Y–Y′. (A light source of 3200° K., for example, is used as the light input.)

Thus, by using the light input along the axis Y–Y′, a light input such as light of an independent picture, besides the light input from the axis X–X′, can be realized.

Figure 6:
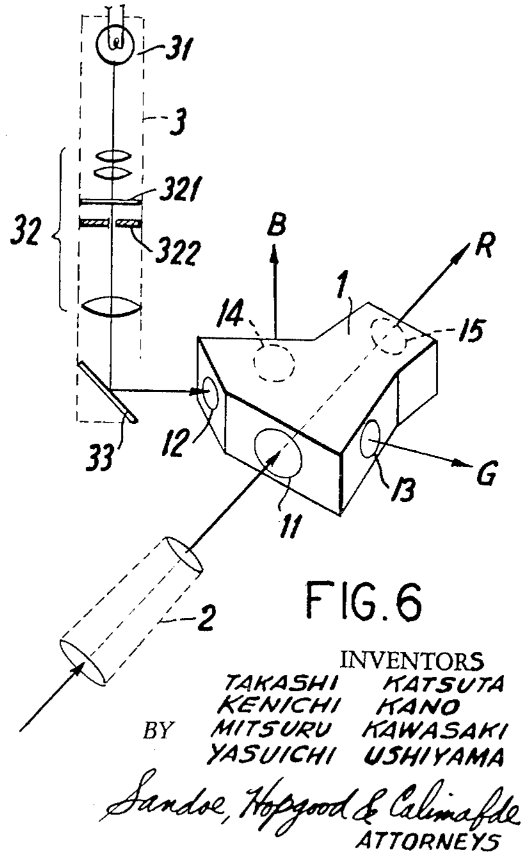
FIG. 6 depicts an embodiment of this invention.

Referring to FIG. 6, which illustrates a diagrammatical view of an embodiment of a camera according to this invention, a housing 1 has a color separation prism such as that of FIG. 2 therein, and has apertures 11 through 15.

The light from objects is collimated by a receiving lens system 2, and is admitted into the prism in the housing 1 through the apertures 11 which is orthogonal to the plane *a–a″* of the prism (see FIG. 2). The light is thus separated into three primary colors in a manner as above described in connection with FIG. 2, and green, blue, and red components are obtained through the apertures 13, 14 and 15, respectively. The apertures 13, 14, and 15 are opposite to the trimming filters VII, V and VI (see FIG. 2) of the prism in the housing 1.

A lamp housing 3 for a bias light includes a lamp 31, an optical lens system 32 (including a filter 321 and a pin hole 322) for collimating the light from the lamp 31, and a reflection plate 33 for changing the direction of the light so that bias light may be admitted through the aperture 12 into the prism along the auxiliary axis Y–Y′ (see FIG. 2).

The bias light is separated into green, blue, and red components in the manner as above described in connection with FIG. 2, to be obtained through the apertures 13–15, respectively.

The three components of the light from the viewed objects, together with the bias light, are applied to pick-up tubes such as plumbicon tubes (not shown) which are arranged opposite to corresponding apertures 13–15 respectively, and are converted into electrical signals in a conventional manner, as is accomplished in the prior art.

In this embodiment, the light from the viewed subject is not reduced on the way to the pick-up tube, because the bias light is admitted into the prism along a different axis from the main axis thereof and apparatus for providing bias light is not disposed between the viewed objects and the pick-up tubes. Furthermore, the bias light can be applied in the form of parallel rays so that shading may not be required.

By employing a projector or the like instead of a lamp house, a test chart is projected on each pick-up tube through the axis Y–Y′, so that adjustment of the camera may be easily achieved.

In the above described embodiment of the present invention, the first color separation plane is used to separately reflect the green wavelength component. Alternatively, this first color separation plane may be used to separately reflect the red or blue wavelength component.

While the principles of the invention have been described above in connection with a specific embodiment and a particular modification thereof, it is to be clearly understood that this description is made only by way of example and not limitation regarding the scope of the present invention.

We claim:

1. A color television camera which comprises an optical receiving lens system having an optical axis, color separation means having a main axis, an auxiliary axis, and three color component emitting planes, said color separation means being arranged after said optical receiving lens system in such manner that said optical axis of said lens system is aligned with said main axis of said color separation means for supplying all output light from said lens system, without attenuation, to said color separation means;

means for generating auxiliary light, in the form of parallel rays, which is arranged with respect to said auxiliary axis of said color separation means such that said parallel rays advance along said auxiliary axis;

three pick-up tubes, each associated with a different one of said three color component emitting planes of said color separation means;

whereby incident light from said receiving lens system and said auxiliary light are separated into three color components and, thereafter, converted into electrical signals;

wherein said color separation means comprises plural prisms, a first color separation plane disposed in the interior of said color separation means between contiguous ones of said prisms, and a total reflection plane disposed separately from and independently of said first color separation plane, whereby said auxiliary light can be admitted into the prism by making the auxiliary light incident to said total reflection plane in such a manner that said auxiliary light may be totally reflected thereat.

2. A color television camera which comprises an optical receiving lens system having anoptical axis;

color separation means having a main axis, an auxiliary axis, and three color component emitting planes, said color separation means being aranged after said optical receiving lens system in such a manner that said optical axis of said lens system is aligned with said main axis of said color separation means;

means for generating auxiliary light, in the form of parallel rays, which is arranged with respect to said auxiliary axis of said color separation means such that said parallel rays advance along said auxiliary axis;

and three pick-up tubes, each associated with a different one of said three color component emitting planes of said color separation means;

whereby incident light from said receiving lens system and said auxiliary light are separated into three color components and, thereafter, converted into electrical signals, wherein said color separation means comprises a prism comprising:

a first triangular prism block having a total reflection first entrance plane for first entrance of light into said prism, a second plane having a first color trimming filter, and a third plane comprising a first color separation plane;

a second triangular prism block having a total reflection plane, a second plane contacting said first color separation plane of said first prism block, and a third plane for permitting the entrance of auxiliary light into said prism;

a third triangular prism block having a total reflection plane contacting said total reflection plane of said second prism block, a second plane comprising a second color separation plane, and a third plane having a second color trimming filter;

a fourth prism block having a plane contacting said second color separation plane of said third prism block, and a plane having a third color trimming filter, whereby a first light input admitted into said prism through said first entrance and auxiliary light admitted into the prism through said second entrance can be separated into three color components.

References Cited

UNITED STATES PATENTS

| | | | |
|---|---|---|---|
| 3,590,145 | 6/1971 | Schneider et al. | 178—5.4 T C |
| 3,602,637 | 8/1971 | Katsuta et al. | 178—5.4 K |

ROBERT L. GRIFFIN, Primary Examiner

J. C. MARTIN, Assistant Examiner

U.S. Cl. X.R.

178—5.4 E; 350—173